United States Patent Office 2,884,446
Patented Apr. 28, 1959

2,884,446

N-BIPHENYLYL AND N,N'-BIPHENYLENE-BIS-β-AMINONAPHTHOLSULFONIC ACIDS

Sien Moo Tsang, Middlesex, and Robert Sidney Long, Bound Brook, N.J., assignors to American Cyanamid Company, New York, N.Y., a corporation of Maine No Drawing. Application May 31, 1957
Serial No. 662,570

7 Claims. (Cl. 260—509)

This invention relates to new intermediates for azo dyes. More specifically, it relates to new coupling intermediates of the structure:

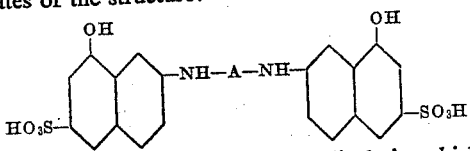

in which A is a 4,4'-biphenylene radical, in which the point of attachment of the imino groups is to a beta position of the naphthalene nucleus.

There exists a need for azo dyes for cotton which combine deep shade, substantivity, and fastness to light, washing and resin aftertreatment (e.g., creaseproofing). In the past, attempts have been made to get dyes for cotton combining all these good properties. These attempts have consisted of building long, expensive dye molecules, or metallization on the fiber and in substance, or of combinations thereof. These efforts of the prior art have not been fully effective, so far as obtaining fast, deep-shade, substantive dyes for cotton is concerned. Sufficient bathochromicity (i.e., deepness of shade), sufficient substantivity and fastness combined in a single dye molecule, has not been obtained.

We have found that the classes of dyes which we have invented and claimed in our copending application, Serial No. 555,769, filed December 28, 1955, of which this application is a continuation-in-part, possess an unexpected bathochromicity, and moreover, possess an unexpected substantivity when used as metallized and metallizable azo dyes for cotton. Moreover, these dyes show good fastness to light, washing and aftertreatment with resins.

By methods well known in the art, a radical of the biphenyl series may be connected with the amino group of a β-aminonaphtholsulfonic acid. The dyes of our invention are derived from intermediates of this type. Compounds such as 4-aminobiphenyl, 4'-chloro-4-aminobiphenyl, 2'-nitro-4-aminobiphenyl and other amino derivatives of the biphenyl series in which the amino group is in 4 and/or 4'-positions, may be condensed with the amino group of a β-aminonaphtholsulfonic acid in aqueous medium in the presence of sodium bisulfite. For instance, 4-amino-biphenyl condenses with J-acid in this way to form p-xenyl J-acid:

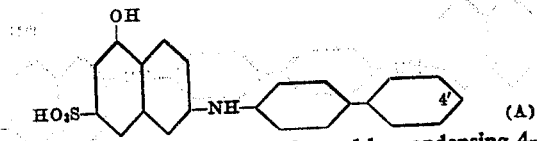

The same intermediate is also formed by condensing 4-aminobiphenyl with 1,6-dihydroxynaphthalene-3-sulfonic acid. This p-xenyl J-acid intermediate and the corresponding p-xenyl gamma acid are azo coupling components coupling in the 2-position and serve as terminal azo components.

If, in place of 4-aminobiphenyl, benzidine is used, a free amino group occupies the 4'-position in the formula above. The intermediate containing the free amino group is then further condensed with the same or with a different β-aminonaphtholsulfonic acid to form bis-compounds capable of coupling twice in 2 and 2'-positions.

Instead of reacting the free amino group in the 4'-amino p-xenyl J or gamma acid with another mol of β-aminonaphtholsulfonic acid, the group can be diazotized and coupled. The intermediate thus serves as a diazo component for the preparation of secondary azo or polyazo dyestuffs. Like the p-xenyl-β-aminonaphtholsulfonic acids without a 4'-amino group, these compounds, when coupled into by a diazo component having a metallizable group ortho to the diazo, form the new dyes of our invention. Alternatively, one mol of a biphenylene diamine is condensed directly with two mols of a β-aminonaphtholsulfonic acid to form a symmetrical compound capable of being coupled twice. For example, benzidine, condensed with two mols of J-acid, using the Bucherer reaction, forms a compound of the formula:

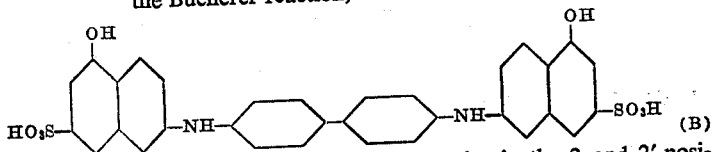

which is capable of coupling twice in the 2 and 2'-positions. Instead of benzidine, there may be used benzidine monosulfonic acid, tolidine, dianisidine and the like. Bis-azo compounds of this type form one special embodiment of our invention and the intermediate coupling components form another class of compounds. This application relates specifically to this latter class of intermediate coupling components.

The intermediates which we have described above are reacted with diazotized or tetrazotized aromatic amines or amino dyes to form mono, or polyazo dyes. As examples of some of the preferred diazo components, there may be mentioned anthranilic acid, 5-aminosalicylic acid, 2-aminophenol-4-sulfonic acid, 2-aminophenol-4-sulfonamide, 2-amino-5-chloro-1-methoxybenzene-4-sulfonic acid, sulfoanisidine, 1-amino-2,4-dichloro-6-methylbenzene-5-sulfonic acid, (in which the 2-chloro group is replaced by OH on metallization), 2-amino-1-naphthol-6-sulfonic acid, 5-nitro-2-aminophenyl, 5-sulfo-3-amino-2-hydroxybenzoic acid, 1-amino-6-sulfo-2-naphthoxyacetic acid, and 1-phenyl-3-methyl-4-amino-5-pyrazolone. Also aminoarylazo compounds can be used as diazo components in making the dyes of our invention, provided they have a metallizable group ortho to the amino group. Some of the preferred tetrazo components are dianisidine and the closely related 3,3'-dihydroxy-4,4'-diaminodiphenyl, 3,3'-dicarboxy-4,4'-diaminodiphenyl, and benzidine 3,3'-diglycollic acid. These tetrazo components are used for the purpose of getting a wider range of shades. Tetrazotized diamines are coupled first to a standard coupling component containing a metallizable group and then with a mono-condensed intermediate of our invention such as p-xenyl-J-acid or p-xenyl-gamma acid, or both couplings can be done on the latter components.

The special intermediates used to form the new azo dyes of our invention as claimed in our parent application fall into three classes, whose modes of utilization vary. These consist of (a) the compounds of the type illustrated by compound (A), (b) the 4'-amino derivatives of these, and (c) the compounds of the type illustrated by compound (B), which is the sole type claimed in this divisional application. Compounds of class (a) and (b) can be used as the coupling components in metallized mono-azo dyes of the terminal coupling components in poly-azo dyes. The intermediates of class (c) are preferably used as the middle coupling com-

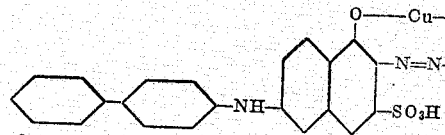

ponents of metallized azo dyes in which diazo components are coupled into them and metallized.

The intermediates of type (b) are prepared by coupling diazotized 4'-amino-p-biphenyl-β-aminonaphtholsulfonic acids with coupling components. The resultant azo compounds are then the intermediates for preparing azo dyes of type (1). These azo dyes can also be prepared by first coupling into the 4'-amino-p-biphenyl-β-aminonaphtholsulfonic acid and then diazotizing the amino group and coupling. The coupling components to be used by either of these methods may be any desired coupling component. When the biphenyl-β-aminonaphtholsulfonic acid has metallizable groups ortho to the amino group (e.g., the product from dianisidine and

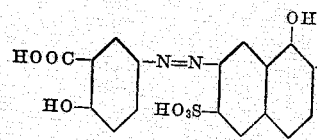

J-acid), it is especially useful to couple to a coupling component also having metallizable groups ortho to the point of coupling. Such coupling components include phenols such as resorcinol, naphthols, naphthol sulfonic and carboxylic acids, 1-phenylpyrazolones, barbituric acid, benzoylacetonitrile, acetoacetanilide, and the like. If a second metallization is not desired any coupling component may be used, depending on the shade desired. Alternatively, one may couple to o-hydroxycarboxylic acids such as salicylic acid, and cresylic acid, in which case the final dye on metallization on the fiber becomes metallized in that residue.

It is a special embodiment of our invention that the intermediate dyes prepared in the practice of our invention, when dyed on cotton or on animal fibers, may be metallized on the fiber to form metal-containing dyes of good fastness to washing and light and to resin aftertreatments used in creaseproofing and fabric finishing.

The dyes of our invention may also be metallized directly, "in substance," with heavy metal salts of atomic numbers 24 to 30 to give heavy metal containing azo dyestuffs. For dyes substantive to cotton, we prefer to metallize with copper salts, a preferred method of metallization being with copper sulfate in aqueous medium in the presence of amines or ammonia, or in aqueous medium with copper sulfate in the presence of acetic acid or other fatty acid, or of salt, or an alkali salt of a fatty acid. For example, when the disazo dyestuff formed by coupling one mol of dianisidine with two mols of p-xenyl J-acid is copperized by the first preferred method mentioned above, a metallized dye of the formula:

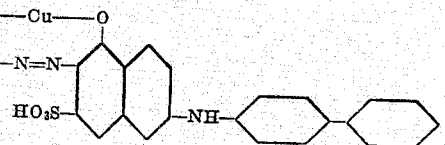

is formed. This disazo dye is slightly greener, brighter and appreciably more substantive to cotton than the corresponding copperized dye formed by using phenyl J-acid in place of p-xenyl J-acid, i.e., having a phenyl instead of a diphenyl group at each end of the molecule.

It is an indication of the surprising substantivity of the dyes of our invention that even monoazo dyes, as prepared for example from p-xenyl J-acid, have significant affinity to cotton. Monoazo dyes are not generally substantive.

An example of the type of azo dyes obtainable from the intermediates claimed in this application, is the excellent brown for cotton obtained by using the bis-Gamma acid derivative:

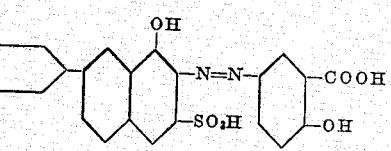

which may be copperized in substance or on the fiber. Aftertreatment with copper changes the shade to a redder brown and increases the light fastness markedly. The bis-J-acid series are violets and blues of marked brightness.

The metallizable dyes of our invention, whether metallized on the fiber or in substance, give strong shades of violet, blue, brown, olive, etc., which are not only useful cotton dyes but dye animal fibers just as well. They are, therefore, generally useful and their fastness increases their utility.

The following examples illustrate this invention. They are not intended to limit it. Parts are by weight unless otherwise noted.

*Example 1*

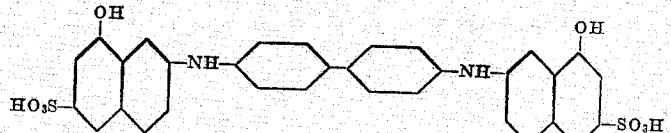

A mixture of 51.4 parts of benzidine hydrochloride, 158 parts of 91% gamma acid, 320 parts of water, 95 parts of 16.87% sodium hydroxide solution and 200 parts of sodium metabisulfite is heated at 104°–105° C. until the reaction is complete. The reaction mixture is then cooled to room temperature and the product isolated by filtration and washed with small amounts of water. The product is then dissolved in 100 parts of water by the addition of 95 parts of 16.87% caustic soda solution and reprecipitated by the addition of acetic acid. It is again isolated by filtration and dried.

*Example 2*

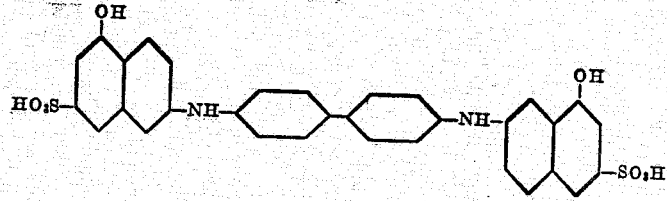

A mixture of 51.4 parts of benzidine hydrochloride, 68.5 parts of 76% J-acid, 40 parts by volume of 5 N potassium hydroxide and 100 parts of sodium metabisulfite in 320 parts of water is heated at reflux until formation of the desired 6-(4'-amino-4-biphenylylamino)-1-naphthol-3-sulfonic acid product is complete. The mixture is then cooled to room temperature. The product is isolated by filtration, washed with 900 parts by volume of 25% sodium acetate solution, sucked down and dried.

The product is dissolved in 575 parts of water with the addition of 50 parts by volume of 5 N potassium hydroxide solution, treated with a small amount of sodium hydrosulfite, Darco and Super-Cel and filtered. To the filtrate is added sodium acetate followed by acetic acid to acidification. Additional sodium acetate may be added to complete the precipitation. The reprecipitated product is isolated by filtration and washed with a small amount of water.

The product is slurried in 380 parts of water to which is added 52.5 parts of 91% gamma acid and 200 parts of sodium metabisulfite. The mixture is heated at reflux until the reaction is complete. The mixture is then cooled to room temperature and the product, N-(5-hydroxy-7-sulfo-2-naphthyl)N'-(8-hydroxy-6-sulfo-2-naphthyl)benzidine, is isolated by filtration and sucked dry. The cake is then dissolved in 250 parts of water with the addition of 85 parts by volume of 5 N caustic soda solution, clarified with Darco, Super-Cel and hydrosulfite at 50° C. and reprecipitated with sodium acetate and acetic acid. The reprecipitated product is then isolated by filtration, washed with 10% sodium acetate solution and dried.

*Example 3*

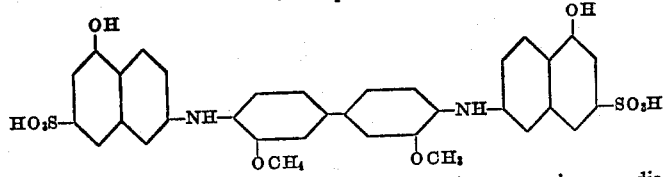

The procedure of Example 1 is followed using an equivalent amount of J-acid in place of the gamma acid and an equivalent amount of dianisidine in place of the benzidine.

*Example 4*

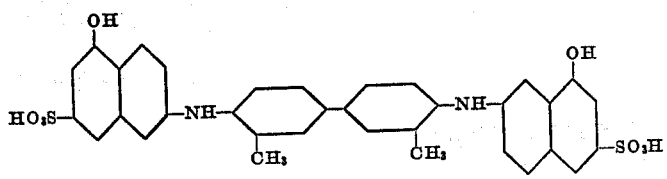

The procedure of Example 2 is followed using an equivalent amount of tolidine in place of the benzidine. Similarly, if equivalent amounts of 3,3'-dichlorobenzidine and 3,3'-dicarboxybenzidine are used, the correspondingly substituted intermediate is obtained.

*Example 5*

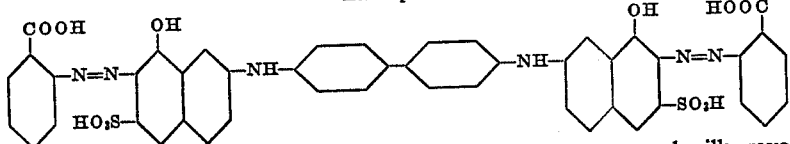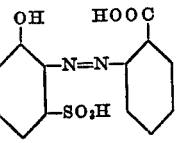

To 100 parts of water is added 6.5 parts of the product of Example 1 and 10.6 parts of soda ash. The mixture is chilled to 10° C. A solution made by diazotizing 2.81 parts of 98% anthranilic acid in 50 parts of water and 10 parts by volume of 5 N hydrochloric acid solution with 20 parts by volume of normal sodium nitrite solution is added slowly and the coupling mixture stirred until reaction is complete. To isolate the disazo dye, 30 parts of sodium chloride is added and the mixture is heated at 60–70° C., followed by cooling to 30° C. The dye is isolated by filtration, washed with two 50-part by volume portions of 15% brine, sucked down and dried.

When dyed on cotton, the product gives a blue-red shade of good wash and light fastness. Acetate fiber is left white. When aftertreated at the boil in an aqueous bath with copper sulfate in the presence of acetic acid and bichromate, the shade on cotton changes from blue-red to a red-violet and wash and light fastness are increased.

*Example 6*

In Example 5, 2-aminophenol-4-sulfonic acid is used as the diazo component and the 6.45 parts of resultant disazo dyestuff is copperized by heating at 90–95° C. in a mixture of 150 parts of water, 4.25 parts copper sulfate pentahydrate in 50 parts water, 10 parts by volume of 20% acetic acid and 10 parts sodium acetate trihydrate. The product is filtered and washed with 25% brine and dried. A copperized disazo dyestuff dyeing cotton a violet shade is obtained.

*Example 7*

If in Example 5, the coupling component used is from Example 2 instead of from Example 1, a corresponding disazo dye is obtained, with, however, a very different shade. Its shade is best described as similar to Vat Olive T, when dyed on cotton.

When aftertreated with copper sulfate in the presence of acetic acid and a small amount of bichromate, the shade becomes a neutral brown, very fast to light.

When metallized in substance, a copperized dye of good solubility is obtained which dyes cotton and also dyes wool, silk, rayon, acetate and spun nylon brown shades fast to washing and light.

*Example 8*

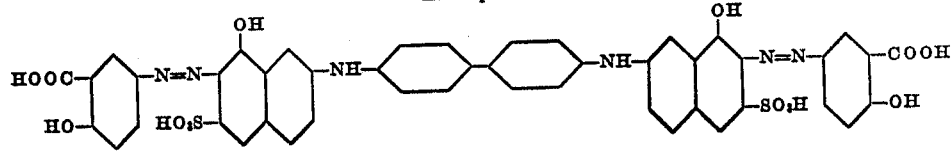

The anthranilic acid diazo component in Example 5 is replaced with 5-amino salicylic acid. A brown dye of exceptional strength is obtained, which when dyed on cotton gives brown shades fast to washing and light. On aftertreatment with copper the shade becomes redder and the light fastness and wash fastness become ever better.

*Example 9*

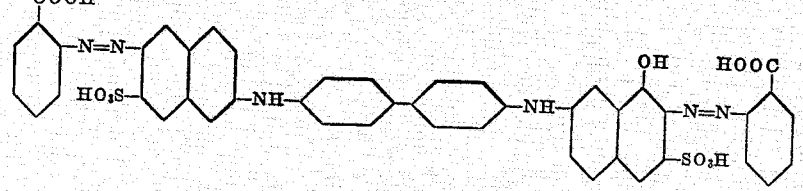

In Example 5, instead of using the intermediate for Example 1, the intermediate from Example 2 is used. A disazo dye is formed which dyes cotton a red-brown shade. It also dyes silk and wool. When aftertreated with copper sulfate in a manner similar to that of Example 5, the shade of the dyed cotton becomes a brown-violet with good light fastness.

When the disazo dye is metallized in substance with copper sulfate, a brown-violet of good fastness to light is obtained when dyed on cotton, silk and wool. The dye exhausts well.

When 2-aminoanisole-4-sulfonic acid is used instead of anthranilic acid and metallized with copper in substance, a red-violet shade is obtained on cotton, wool and silk.

We claim:

1. The new coupling components of the structure:

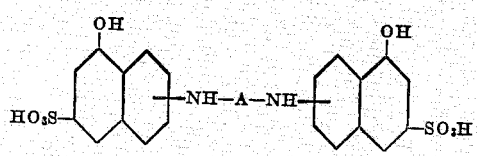

in which A is selected from the group consisting of 4,4'-biphenylene, 3,3'-dimethoxy-4,4'-biphenylene, 3,3'-dichloro-4,4'-biphenylene and 3,3'-dicarboxy-4,4'-biphenylene and the points of attachment of the imino groups are beta positions of the naphthalene nuclei.

2. The new coupling components of the structure:

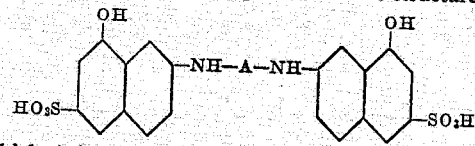

is which A is selected from the group consisting of 4,4'-biphenylene, 3,3'-dimethoxy-4,4'-biphenylene, 3,3'-dichloro-4,4'-biphenylene and 3,3'-dicarboxy-4,4'-biphenylene.

3. The compound of claim 2 in which A is 4,4'-biphenylene.

4. The new coupling components of the structure:

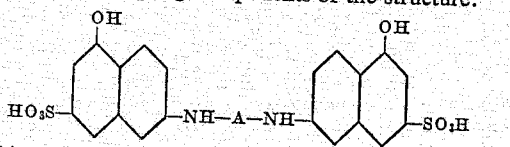

in which A is selected from the group consisting of 4,4'-biphenylene, 3,3'-dimethoxy-4,4'-biphenylene, 3,3'-dichloro-4,4'-biphenylene and 3,3'-dicarboxy-4,4'-biphenylene.

5. The compound of claim 4 in which A is 4,4'-biphenylene.

6. The new coupling components of the structure:

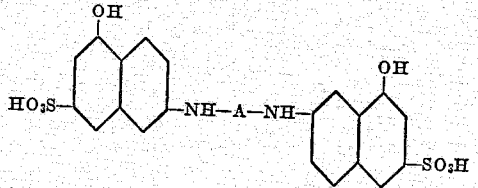

in which A is selected from the group consisting of 4,4'-biphenylene, 3,3'-dimethoxy-4,4'-biphenylene, 3,3'-dichloro-4,4'-biphenylene and 3,3'-dicarboxy-4,4'-biphenylene.

7. Compounds of claim 6 in which A is 4,4'-biphenylene.

References Cited in the file of this patent

UNITED STATES PATENTS 2,741,655    Riat et al.  ---------------- Apr. 10, 1956